(12) United States Patent
Loosveld et al.

(10) Patent No.: US 8,918,475 B2
(45) Date of Patent: *Dec. 23, 2014

(54) METHOD OF AND COMPUTER PROGRAM FOR MANAGING ONE OR MORE AGRICULTURAL DEVICES

(75) Inventors: Serge Louis Loosveld, Borne (NL); Patrick Philip Jacob Van Der Tol, Amersfoort (NL); Xiangyu Song, Rotterdam (NL)

(73) Assignee: Lely Patent N.V., Maassluis (NL)

( * ) Notice: Subject to any disclaimer, the term of this patent is extended or adjusted under 35 U.S.C. 154(b) by 394 days.

This patent is subject to a terminal disclaimer.

(21) Appl. No.: 13/169,116

(22) Filed: Jun. 27, 2011

(65) Prior Publication Data
US 2011/0308627 A1   Dec. 22, 2011

Related U.S. Application Data

(63) Continuation-in-part of application No. 12/752,195, filed on Apr. 1, 2010.

(30) Foreign Application Priority Data

Apr. 2, 2010   (NL) ..................................... 1036806

(51) Int. Cl.
| | |
|---|---|
| *G06F 15/16* | (2006.01) |
| *G06F 15/173* | (2006.01) |
| *A01J 3/00* | (2006.01) |
| *A01J 5/00* | (2006.01) |
| *G06Q 50/02* | (2012.01) |
| *G06Q 10/06* | (2012.01) |
| *G06Q 10/10* | (2012.01) |

(52) U.S. Cl.
CPC ................ *G06Q 50/02* (2013.01); *G06Q 10/06* (2013.01); *G06Q 10/10* (2013.01)
USPC .......................... 709/217; 709/224; 119/14.01

(58) Field of Classification Search
USPC .............................. 709/220–226, 217; 119/14
See application file for complete search history.

(56) References Cited

U.S. PATENT DOCUMENTS

| | | | | |
|---|---|---|---|---|
| 6,823,817 | B2 * | 11/2004 | van den Berg et al. | 119/14.02 |
| 7,028,559 | B2 * | 4/2006 | Oort et al. | 73/861.18 |
| 7,036,981 | B2 * | 5/2006 | Veenstra et al. | 374/142 |
| 7,530,113 | B2 * | 5/2009 | Braun | 726/28 |
| 7,711,842 | B2 * | 5/2010 | Liu et al. | 709/232 |
| 2001/0039838 | A1 | 11/2001 | van den Berg | |
| 2002/0054831 | A1 | 5/2002 | Berg et al. | |
| 2002/0178387 | A1 | 11/2002 | Theron | |

(Continued)

FOREIGN PATENT DOCUMENTS

WO   2007036886 A2   4/2007

*Primary Examiner* — Shirley Zhang
(74) *Attorney, Agent, or Firm* — Hoyng Monegier LLP; Minerva Rivero; David P. Owen

(57) ABSTRACT

A system and method for managing an agricultural device, including connecting the agricultural device to a network, collecting operational data relating to the agricultural device, granting an access right in respect of the collected operational data to an entity connected to the network, receiving data from the entity in response to the access right, and managing the agricultural device on the basis of the collected operational data and the data from the entity. The method may be implemented for managing multiple agricultural devices, and may be implemented in a computer readable medium. In one embodiment, the operational data relates to clinical mastitis detection.

17 Claims, 2 Drawing Sheets

(56) References Cited

U.S. PATENT DOCUMENTS

| | | |
|---|---|---|
| 2002/0198990 A1* | 12/2002 | Bradfield et al. ............ 709/224 |
| 2003/0065480 A1* | 4/2003 | Vijverberg et al. ........... 702/182 |
| 2004/0025606 A1* | 2/2004 | Veenstra et al. ............ 73/865.9 |
| 2006/0053023 A1 | 3/2006 | Matsunaga et al. |
| 2006/0243211 A1* | 11/2006 | Eriksson et al. ........... 119/14.08 |
| 2007/0010914 A1 | 1/2007 | Johnson et al. |
| 2007/0272159 A1* | 11/2007 | Francke et al. ............ 119/14.14 |
| 2011/0192356 A1* | 8/2011 | Loosveld et al. ............ 119/840 |

* cited by examiner

METHOD OF AND COMPUTER PROGRAM FOR MANAGING ONE OR MORE AGRICULTURAL DEVICES

CROSS REFERENCE TO RELATED APPLICATIONS

This application is a continuation-in-part of U.S. patent application Ser. No. 12/752,195 filed on Apr. 1, 2010, which claims priority from Netherlands application number 1036806 filed on Apr. 2, 2009, and the contents of both applications are hereby incorporated by reference in their entireties.

BACKGROUND OF THE INVENTION

1. Field of the Invention

The invention relates to a method of managing an agricultural device and to a computer program for carrying out the method.

2. Description of the Related Art

It is known for an agricultural device, such as a milking device which is used to milk dairy animals such as cows, goats, llamas, buffalos or any other dairy animal, to be managed with a suitable management program. The management program, which is run, for example, on a personal computer, notebook or the like, can record measured data relating to the milking machine and/or dairy animals, record error messages, and identify anomalies, and the like.

For example, testing milk obtained by the milking device for clinical mastitis is known. However, because the sample size is small, and because such machines work in isolation, a heightened accuracy and early detection cannot uniformly be reached.

Clinical mastitis is a common complication among dairy animals, and therefore an important factor to control in the milking process. Lack of accurate and early detection can lead to tainting of the milk supply, as well as costly treatment for the affected dairy animal, or animals (should the mastitis spread through use of contaminated machinery). Therefore any improvements in accuracy and early, accurate and systematic detection are commercially desirable.

However, currently agricultural devices are run through a management program in isolation. There is a need for improved management systems which can take external information into account and which can aggregate external information.

BRIEF SUMMARY OF THE INVENTION

The object of the invention is to improve the management of the agricultural device. To achieve this object, the method of managing an agricultural device comprises, according to the invention:
the connection of the agricultural device to a network;
the collection of operational data relating to the agricultural device;
the granting of an access right in respect of the collected operational data to an other entity which is similarly connected to the network;
the reception of data from the other entity in response to the access right, and
the management of the agricultural device on the basis of the collected operational data and the data from the other entity.

In one embodiment, operational data includes data to determine whether clinical mastitis is present. For example, wherein the mastitis detection parameter comprises at least one of: electrical conductivity, color of milk of a plurality of samples during operation of the milking device, dead milk time and milk yield proportion per quarter for milk.

Clinical mastitis is an inflammatory reaction of the mammary glands of mammals, such as cows. Mastitis can occur due to bacterial or viral infection, and/or when the udders are injured due to chemical, thermal, or mechanical reasons. The result is that there is an increase in white blood cells in the milk, as well as that the milk itself can be tainted.

The complication is a common one in the dairy industry, and thus early and accurate detection are important for minimizing contamination of the milk supply and treating the affected animal.

In this embodiment, the method of managing a milking device, includes:
connecting the milking device to a network;
collecting preliminary mastitis detection operational data from obtained milk, wherein if the milk has a mastitis detection parameter less than or equal to a threshold value then no further operational data is collected;
collecting primary mastitis detection operational data;
granting an access right in respect of the collected primary operational data to a second milking device connected to the network;
receiving primary operational data from the second milking device in response to the access right; and
managing the milking device on the basis of the collected primary operational data of the milking device and the primary operation data from the second milking device, further comprising: defining a benchmark for detection of mastitis for the milking device from primary operational data of at least the second milking device; comparing the primary operational data of the milking device with the benchmark; defining a setting of the milking device based on the collected operational data of the milking device and the operational data of the second milking device; and transmitting the defined setting via the network to the at least one of the milking device and the second milking device.
wherein the mastitis detection parameter comprises at least one of: electrical conductivity, color of milk, dead milk time and milk yield proportion per quarter for milk.

In one embodiment of the aforementioned method, the at least one mastitis detection parameter is analyzed based on a predetermined number of preceding milkings.

In another embodiment, the benchmark is defined as:

$$Z=(x-\mu)/\sigma$$

wherein Z is the benchmark, $\mu$ is the average of the parameter value for at least one of electrical conductivity and color value of the predetermined number of preceding milkings, x is the value of the current milking visit for both electrical conductivity and milk color, and $\sigma$ is the standard deviation of the predetermined preceding milkings. For example, when Z is greater than 2, mastitis is determined to be present.

The agricultural device can thus be managed on the basis of data obtained from the agricultural device and from another entity (for example reference values derived from operational data from other agricultural devices, settings advised by an external party such as an agricultural consultant, settings advised by a service organization, settings advised by an other user of an agricultural device, and the like), with which, for example, a clearer insight can be gained into the operation of an agricultural device. In one embodiment, a further step can be implemented to ensure that settings are not changed without review and approval. In another embodiment, the defined setting is sent to a controller for review before transmission via the network.

For example, in another embodiment the method mentioned above can include the step of comparing the defined settings to the current settings, if the defined settings differ from previous settings by more than a threshold value, then the defined settings are sent to a controller for approval; and if the defined settings fall below the threshold or are approved by the controller, transmitting the defined settings via the network to at least one of the milking device and the second milking device. It will be understood that the controller may be a farmer, an agricultural consultant, or a computer.

In a further embodiment, "supervised learning" can take place, where modifications made by a controller to the settings as described above can further be considered a type of operational data that other milking devices and/or other locations (e.g., farms) can learn from. For example, when the algorithms with current thresholds don't indicate mastitis in a particular cow when this was indeed present, several benchmarks can be used to change the thresholds in such a way that for the future a cow showing this particular data pattern will be designated as having mastitis. In this manner, sensitivity of the system is further improved, without decreasing or perhaps even improving specificity (where false designations of mastitis occur).

By taking operational data from other entities like one or more other agricultural devices into consideration, the technical problem of improving the management of an individual agricultural device can be solved, given that, in the management operations (such as the identification of rejection limits for milk, the detection of faults or malfunctions, the issue of warning messages to a user and many other examples), a larger quantity of data, i.e. also data originating from other agricultural devices or other sources, such as consultants, is used as a reference framework (for example for determining suitable threshold values, rejection limits, settings, time windows between consecutive milkings of individual dairy animals, feed schedules, etc.). Reference frameworks in management systems improve the individual agricultural devices by increasing their accuracy. For example, in the case of clinical mastitis, the system according to the present invention improves the accuracy of the detection of clinical mastitis in milk during a milking. Specifically, both determined sensitivity and specificity are improved. In one embodiment, the sensitivity is above 80% and the specificity is about 99%.

A further advantage of the present invention is that by aggregating data regarding clinical mastitis of cows from different farms, a significant data set is built up, which would take a single location (single farm) too much time to build. And perhaps it is even not possible for a single location to build significant data because the number of individual dairy animals is too small for this. Thus, there is an added advantage for smaller farms who would otherwise not have the advantage of ongoing access to large scale accurate operational data.

Operational data includes data originating from other agricultural devices or other sources, such as consultants, is used as a reference framework, data regarding operational characteristics and/or equipment characteristics (for example an equipment version, race of cows, the type of stall etc. Consultants, for example animal consultants such as veterinarians, can provide a plan for optimizing efficiency of agricultural equipment. For example, the consultants can analyze similar devices and devices an efficiency plan for the device at issue therefrom.

Further, operational data includes measured data relating to the milking machine and/or dairy animals, record error messages, and identified settings of the milking device as well as identified anomalies. Examples of anomalies may include: sickness of an animal, contamination of milk or milk not suitable for consumption, etc. For this purpose, the management system can use a multiplicity of data, such as the time between consecutive milkings of the same animal, measurements carried out on the milk, such as conductivity, colour, optical absorption and/or transmission in specific optical wavelength ranges, quantity of milk per milking, etc.

Feed data, for example the quantity of feed consumed by the dairy animal, data relating to the behavior of the animal, such as the heart rate, mobility, composition of excrement, etc., can also be used. A multiplicity of sensors, such as a step counter, a heart rate monitor, chemical analysis devices, a camera for visible light and/or infrared, etc., can be provided for this purpose.

A manager of the milking device can also input data, such as threshold values or required values, into the management system. An example of such data is a rejection criterion. If, for example, a manager discovers that an animal is sick, these parameters relating to this animal may change, for example the offering of an other quantity of feed, the addition of medication to the feed, the separation of the milk produced by the animal concerned, the admission of the animal to the milking device with an other time interval, etc.

In one embodiment, threshold value also includes the minimum feed per animal, the minimum and/or maximum amount of milk to be received from an animal being milked, and the time periods between milkings of a particular animal.

All of the aforementioned data input into, recorded by or otherwise managed by the management system of the milking device can be regarded as examples of what is referred to as "operational data". Data of this type may be useful for the grouping of operations as well.

The agricultural device may comprise any agricultural device controllable or manageable by a computer, the device may be stationary or mobile, the device may be intended for agriculture or livestock breeding, etc. A number of examples of a device of this type are a milking device, a feed device, a robot such as an autonomous robot, for example a manure robot, a robot to isolate a grazing area, a feed robot, etc. In the context of this document, the term "milking device" may comprise both a fully or partially automated milking robot milking robot and/or a milking device which is to be attached manually by a user to teats of the dairy animal. The dairy animal may include cows, goats, llamas, buffalos, or any other dairy animal.

The agricultural devices may each be provided with their own management device; however, it is also possible for two or more agricultural devices to make use (via the network) of a shared management device, wherein operational data can then be managed, stored and the like separately for each agricultural device. The operational data may be collected through storage of the data, or data derived from the data (such as averages, deviations, outliers, alarms, occurrence of events, or other data) in a memory device, such as a magnetic memory, a data storage card, an electronic memory, etc.

In order to prevent a user of an agricultural device from allowing his or her data to be viewed by any other random user of an other agricultural device, thereby perhaps being able to access commercially sensitive or confidential information, provision of (for example reciprocal) access rights is provided. Only if one user has granted permission to another user can the management system of the user concerned gain access to data from, or data derived from, the operational data of the other user (such as an other agricultural device), wherein the operational data may comprise, for example, a summary, report, statistics or the like.

The network may comprise the Internet or any other public or private data network or telecommunications network, operating via any suitable protocol or protocols.

In one embodiment, the management system is connected via a network to a central device, such as a server on the premises of, for example, a supplier or service-providing party, in order to be able to carry out remote maintenance therefrom, such as the upgrading of software, detection of defects, diagnosis of the milking device, identification of a need for on-site maintenance, etc. In this embodiment, the management system can be connected via the Internet or a telecommunications connection to the central device for this purpose.

In another embodiment, the other entity comprises another agricultural device and the data received from the other entity comprise operational data from the other agricultural device. Data originating from one or more other agricultural devices can thus be used in the management of an agricultural device. The other entity comprises an, in particular similar, other agricultural device. As a result thereof, the data received are very relevant to the management of the agricultural device. By 'similar' is meant here: having the same purpose. A milking robot will thus have the same purpose as a conventional milking device with manual teat cup connection, i.e. the milking of a dairy animal. Therefore, milking settings and the like can certainly be equal for both devices. Of course, some settings, such as admission criteria or teat detection algorithms, can be relevant to only one of the devices. Therefore, for that specific purpose, a conventional milking device and a milking robot are different from each other.

Furthermore, one aspect of the invention can also be described as a method of managing at least two agricultural devices, comprising:
  the connection of the agricultural devices to a network;
  the collection of operational data relating to each of the at least two agricultural devices;
  the provision of reciprocal access rights to the collected operational data, and
  the management of the agricultural devices on the basis of the collected operational data.

The management of the agricultural device may comprise:
  the definition of a benchmark for the agricultural device from operational data from at least the other agricultural device, and
  the comparison of the operational data of the agricultural device with the benchmark.

By defining a benchmark from data of an other agricultural device, a comparison can be made in a simple and clearly understandable manner (for example in the form of software) between the operational data of the agricultural device and a standard, derived from the operational data of one or more other agricultural devices. By using operational data of a plurality of other agricultural devices, fluctuations will average out more, as a result of which a better reference framework for management can generally be obtained. A manager can similarly enter the other agricultural devices of which data must be used to define the benchmark concerned, so that the user himself can select (for example from the group with which reciprocal information is exchanged) a number of suitable data elements for the benchmark concerned.

The method may furthermore comprise: the definition of a setting of the agricultural device on the basis of the operational data of the agricultural device and the operational data of the other agricultural device. One or more parameters of the management device can thus be set not only on the basis of the operational data which have been collected during the operation of the agricultural device concerned, but also any given data obtained from the operation of one or more other agricultural devices can also be used.

The granting of the access right can take place in response to a respective release instruction by a manager of the respective agricultural device, so that a user has control over who gains access to operational data (or data derived therefrom) of the respective agricultural device. The (for example reciprocal) release of manager contact data in response to the release instruction can also be provided here. Examples of manager contact data may, for example, include: e-mail addresses or other contact data, access to each other's user profiles, location data and operational information, or other data which one user might wish to share with other users. It is thus possible to allow the users to exchange information with one another relating to business operations, management of the milking process, livestock management or any other information relevant to the parties concerned.

It is also possible for settings for the at least one agricultural device to be defined from the operational data which are collected by the agricultural device or devices (for example by a central computer device connected to the network) and to be transmitted via the network to the at least one agricultural device. Thus, it is possible, for example, for a manufacturer or service organisation of the agricultural devices, where operational data of a large number of agricultural devices are available via the network, to use these data (autonomously or through proposal to a user of the agricultural device) to carry out settings, adjustments, etc. of one or more parameters (such as, for example, threshold values, or one or more of the other examples mentioned earlier in this document). An improvement in the management of a large number of agricultural devices can thus be achieved centrally, given that use can be made of the operational data and expertise of a large number of users.

Here, it is also possible to effect different settings for different agricultural devices or groups thereof, and thus to collect operational data during operation therewith, to compare the results obtained with one another and to be able to derive a most suitable setting from the different settings on the basis thereof. An optimum setting can thus be quickly found over a multiplicity of agricultural devices. A process of this type can also be performed repetitively, for example to define an optimum value (or a series of optimum values or an optimum range) for an other parameter also, or to repeat a definition of this type in order to be able to respond to changing operating circumstances or environmental factors.

It should also be noted that the method described in this document must be understood as a method which is to be implemented by a computer, referred to as a "computer implemented method", or a method implementable on a computer readable medium.

The invention also relates to a computer readable medium comprising program instructions for carrying out the method according to the invention, if the program is loaded onto a data processing device, such as a computer.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
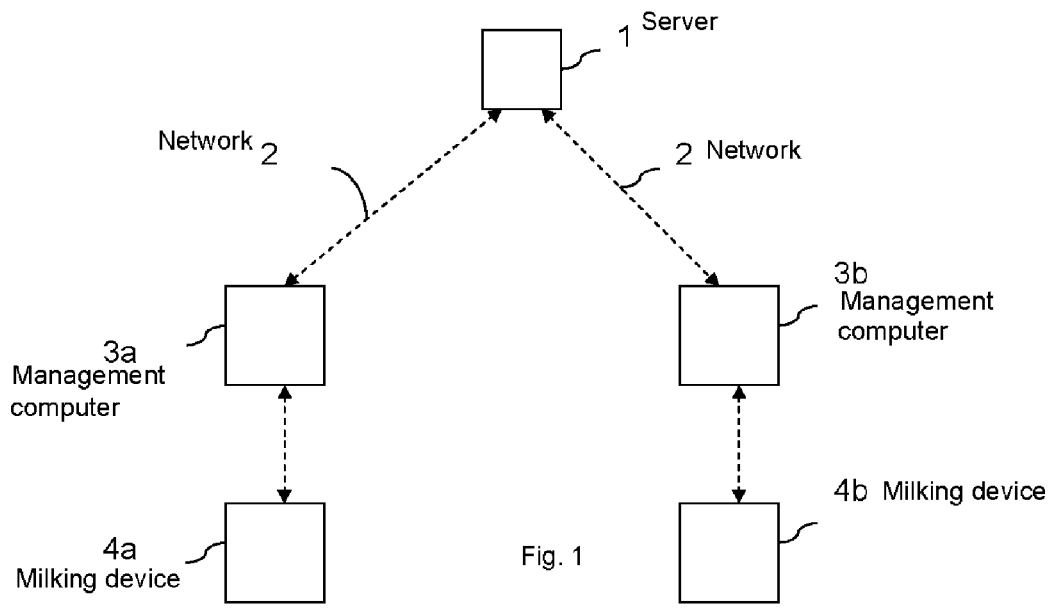
FIG. 1 is a block diagram of a method of managing agricultural devices according to the invention.

Further characteristics, advantages and effects of the invention will become clear with reference to the attached drawing and the following description, in which a non-limiting example embodiment is presented, in which:

FIG. 1 shows a server 1 which is connected via a network 2 (such as the Internet) to a first and a second management computer 3a, 3b, each of which is connected via a suitable data communications connection to a respective agricultural device, in this example a milking device 4a, 4b, such as a milking robot. The management computers may comprise, for example, a personal computer with operational management software thereon, a memory for storing operational data which, for example, are obtained during the operation of the milking device, and a communications means, such as a modem, router or the like, for setting up a connection to the Internet. A connection can be set up from the server via the network to the management computers of the milking robots. In managing the robot 4a, the computer 3a can use management data of the two milking robots 4a and 4b. In this example embodiment, a manager of the robot 4b has given permission via the management computer 3b for operational data to be exchanged with the management computer 3a for this purpose. The reciprocal exchange can take place directly; however, it is also possible for the exchange to take place via the server, wherein the operational data concerned can be stored on the server, or in a memory or computer connected thereto. On the basis of the operational data from the robot 4b or a number of other robots (not shown), a benchmark can be defined and the management software of the robot 4a can compare the performance of the robot 4a with the benchmark.

A setting of the agricultural device can be defined on the basis of the operational data of the agricultural device and the operational data of the other agricultural device. An example of such operational data would be the number of mL of milk obtained per healthy cow per day from a milking device. This can be calculated for a sample of cows over a period of time such as a month or a year for each agricultural device, then averaged out to determine what amount is a suitable standard amount of milk to be obtained from the animal.

In one embodiment, the operational data comprises data to detect clinical mastitis. In this embodiment, a preliminary screening, via a preliminary detection is done using at least one of the mastitis parameters. For example, in the preliminary detection, the electrical conductivity of milk passing through part of the milking device, such as the milk quality control system during milking is measured. If the electrical conductivity is equal to or lower than the default threshold value, for example of 4500 μS/cm, the milk is considered healthy and there is no need to do further screening.

If the electrical conductivity is higher than the default threshold value, then a primary detection step must subsequently be performed. In this step, both the electrical conductivity and the color values throughout the milking by the milking device are sampled. Various numbers of samples could used. In one embodiment, the sample size is 10.

One of ordinary skill in the art knows how to determine electrical conductivity and color values. For example, US20020054831 relates to color readings for milk, and is hereby incorporated by reference in its entirety. Further, US2001039838 relates to measuring various factors including electrical conductivity, color in milk, and is hereby incorporated by reference in its entirety.

The samples are then used to determine if clinical mastitis is present. This is done by standardizing the samples with a certain amount of preceding healthy milk visits. In one embodiment, the samples are used to calculate the average and standard deviation of normal milk electrical conductivity and color values of a particular cow. In another embodiment, further variables of dead milking time and milk yield per quarter of the cow were obtained. Dead milking time is the time between the teat cup connection and the first milk flow.

Figure 3:
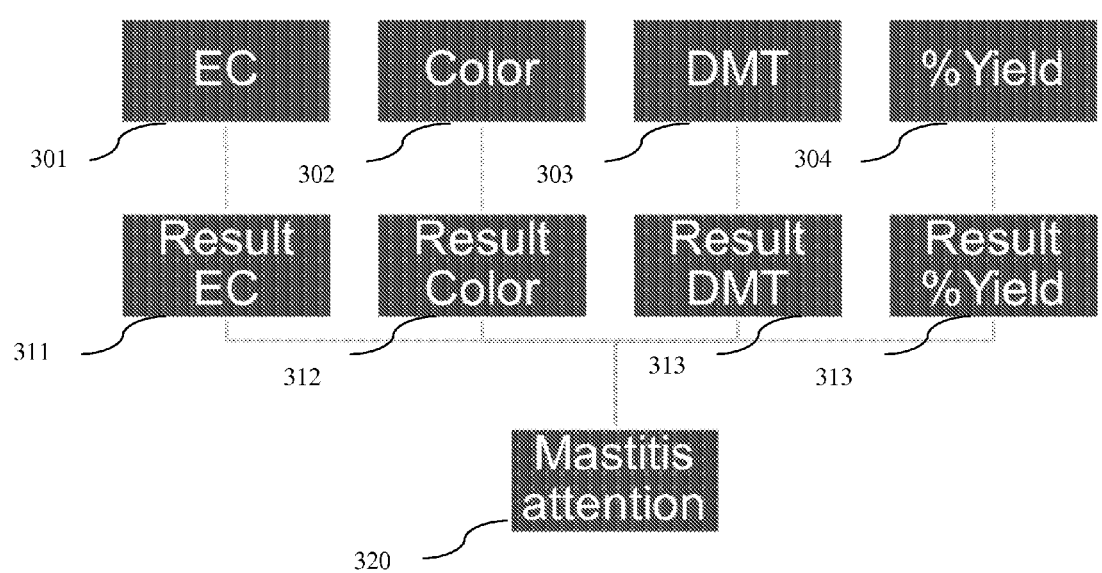
FIG. 3 is a block diagram of a method of managing agricultural devices according to the invention.

FIG. 3 illustrates four parameters according to the present invention: electrical conductivity 301, color 302, dead milking time 303 and milk yield per quarter 304. Each of the obtained values for these parameters is compared to a set of standards, to obtain a Z-score result 311, 312, 313, and 314. A significant z-score (for example above 2) provides a milk visit result that indicates mastitis attention 320. This determined result can subsequently be transmitted to change milk settings.

For the electrical conductivity and color transmittance patterns, the standard score is then calculated by subtracting the average of each parameter value of the 10 preceding milkings from the values of the current milk visit and by dividing the difference with the standard deviation form the 10 preceding milkings as seen in this equation:

$$Z=(x-\mu)/\sigma$$

wherein Z is the benchmark, μ is the average of the parameter value for the electrical conductivity and/or color value of 10 preceding milkings, x is the value of the current milking visit for electrical conductivity (or milk color), and σ is the standard deviation of the 10 preceding milkings.

In one embodiment, for any input, if more than 50% of the samples had standard scores greater than 2 (default value) it is indicated positive for clinical mastitis. However, a standard score greater than 1 or greater than 1.5 can also be used, depending on the desired accuracy of the sample. Further, a standard score greater than 3 can be used to create even more accuracy.

Using this equation and a standard score as a threshold value of 2, the determined sensitivity (SN) is between 27.3 and 57.8%, and the determined specificity (SP) is in the range of 89.9 and 99.5% for an individual farm. When the model is used in an aggregated manner (implementing operational data from multiple farms) according to the invention, the performance increased in that the determined sensitivity was 83.3% and the determined specificity was 99.4%.

A result of at least one parameter value above the benchmark threshold value can be indicative of mastitis. One of ordinary skill in the art will understand that there are various combinations of parameter values that can be used to determine a clinical mastitis benchmark.

The operational data or part thereof can be released in response to a release instruction by a manager of the respective agricultural device. Manager contact data can also be released in the process, so that the managers concerned can exchange information with one another. In one embodiment, the manager can provide an instruction to that the milk of an animal based on operational data that indicates the animal is sick to be channeled to a separate tank as it is not fit for human production. In another embodiment, the manager can provide instructions for increased milking of an animal based on operational data that an animal has clinical mastitis. It may be important to milk cows with mastitis out further than normal.

Thus, a manager (also referred to in this document as a user) of an agricultural device can set up a network of users, consultants and the like.

It is also possible to define settings centrally, for example, in a central computer which is connected to the network, from the collected operational data of the agricultural devices for at least one of the agricultural devices and to transmit these via the network to the agricultural device(s) concerned.

In order to achieve an optimisation, different settings can also be applied in the agricultural devices or for groups thereof, the results obtained can be compared with one another, a most suitable setting can be derived therefrom and can be transmitted to the agricultural devices. This can, for example, be repeated periodically in order to define a most suitable setting.

Figure 2:
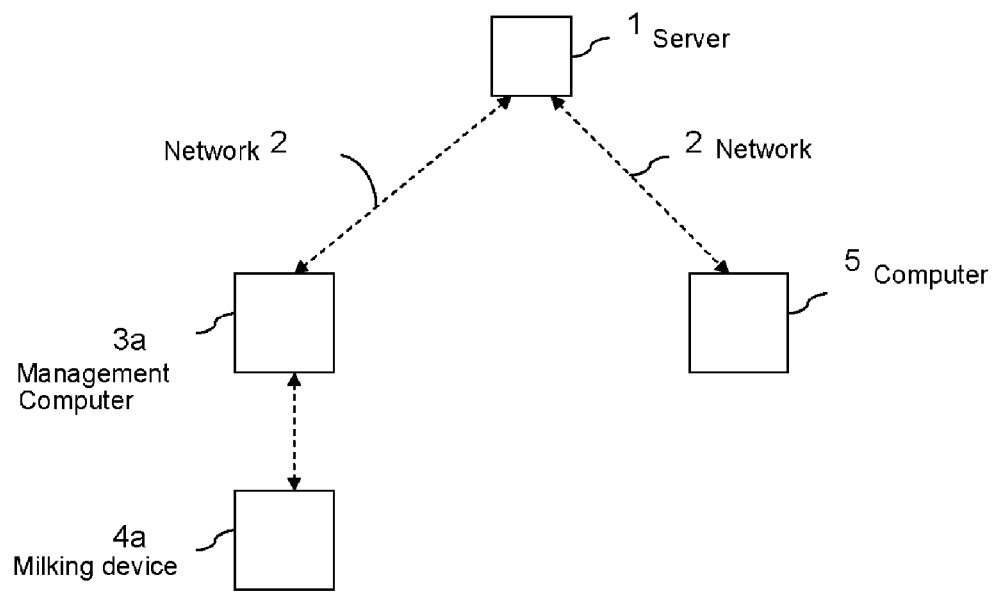
FIG. 2 is a block diagram of a method of managing agricultural devices according to the invention.

FIG. 2 shows a variant of the embodiment which is described with reference to FIG. 1. In this example, a computer 5 of a consultant is connected to the network 2. If the user of the management device 3a grants access to the consultant to view or download operational data (or a part thereof) via the network 2, the consultant can, on the basis thereof, offer advice on the management of the milking device 4a and can transmit this in the form of data (for example settings such as setting values, threshold values, etc.) to the management device 3a and run this automatically or have it run by the user of the management device 3a. Thus, the invention has been described by reference to certain embodiments discussed above. It will be recognized that these embodiments are susceptible to various modifications and alternative forms well known to those of skill in the art. For example, the data, settings and access rights may be modified by for particular agricultural applications.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A non-transient, computer-readable medium containing program instructions for causing a computer to perform the method of managing an agricultural device, comprising:
    connecting the agricultural device to a network;
    collecting operational data relating to the agricultural device;
    granting an access right in respect of the collected operational data to a second agricultural device connected to the network;
    receiving operational data from the second agricultural device in response to the access right; and
    managing the agricultural device on the basis of the collected operational data of the agricultural device and the operation data from the second agricultural device, further comprising:
    defining a benchmark for the agricultural device from operational data of at least the second agricultural device;
    comparing the operational data of the agricultural device with the benchmark;
    defining a setting of the agricultural device based on the collected operational data of the agricultural device and the operational data of the second agricultural device; and
    transmitting the defined setting via the network to the at least one of the agricultural device and the second agricultural device;
    wherein the agricultural device comprises a milking device.

2. The method according to claim 1, wherein the operational data comprises at least one of: time between consecutive milkings of a dairy animal, a measurement of milk obtained from the dairy animal, a recorded error message, an anomaly, and feed data.

3. The method according to claim 1, wherein the operational data comprises manager input data, comprising at least one of: a threshold value, a rejection criterion, and a parameter modification.

4. The method according to claim 1, wherein the granting of the access right takes place in response to a release instruction by a manager of the agricultural device.

5. The method according to claim 4, wherein management contact data is released in response to the release instruction by the manager.

6. The method according to claim 1, comprising the steps of:
    defining from at least one of the collected operational data of the agricultural device and the operational data of the second agricultural device at least one other setting for at least for at least one of the agricultural device, the second agricultural device and a group of agricultural devices;
    transmitting the defined setting via the network to the respective agricultural devices;
    collecting operational data during operation of at least one of the agricultural device, the second agricultural device and the group of agricultural devices with the transmitted setting;
    comparing the collected operational data during operation of at least one of the agricultural device, the second agricultural device and a group of agricultural devices;
    deriving from the other setting, on the basis of the comparison, of a most suitable setting for at least one of the agricultural device, the second agricultural device and a group of agricultural devices; and transmitting the most suitable setting to at least one of the agricultural device, the second agricultural device and a group of agricultural devices.

7. A non-transient, computer-readable medium containing program instructions for causing a computer to perform the method of managing a milking device, comprising:
    connecting the milking device to a network;
    collecting preliminary mastitis detection operational data from obtained milk, wherein if the milk has a mastitis detection parameter less than or equal to a threshold value then no further operational data is collected;
    collecting primary mastitis detection operational data;
    granting an access right in respect of the collected primary operational data to a second milking device connected to the network;
    receiving primary operational data from the second milking device in response to the access right; and
    managing the milking device on the basis of the collected primary operational data of the milking device and the primary operation data from the second milking device, further comprising:
    defining a benchmark for detection of mastitis for the milking device from primary operational data of at least the second milking device;
    comparing the primary operational data of the milking device with the benchmark;
    defining a setting of the milking device based on the collected operational data of the milking device and the operational data of the second milking device; and transmitting the defined setting via the network to the at least one of the milking device and the second milking device.

8. The method of claim 7, wherein the mastitis detection parameter comprises at least one of: electrical conductivity, color of milk, dead milk time and milk yield proportion per quarter for milk.

9. The method of claim 8, wherein the at least one mastitis detection parameter is analyzed based on a predetermined number of preceding milkings.

10. The method of claim 9, wherein the benchmark is defined as:

$$Z=(x-\mu)/\sigma$$

wherein Z is the benchmark, μ is the average of the parameter value for at least one of electrical conductivity and color value of the predetermined number of preceding milkings, x is the value of the current milking visit for both electrical conductivity and milk color, and σ is the standard deviation of the predetermined preceding milkings.

11. The method of claim 10, wherein when Z is greater than 2, mastitis is determined to be present.

12. The method of claim 7, wherein the defined setting is sent to a controller for review before transmission via the network.

13. A non-transient, computer-readable medium containing program instructions for causing a computer to perform the method of managing a milking device, comprising:
connecting the milking device to a network;
collecting preliminary mastitis detection operational data from obtained milk, wherein if the milk has a mastitis detection parameter less than or equal to a threshold value then no further operational data is collected;
collecting primary mastitis detection operational data comprising at least one of: electrical conductivity, color of milk of a plurality of samples during operation of the milking device, dead milk time and milk yield proportion per quarter for milk that has an electrical conductivity of the threshold value based on the preliminary detection;
granting an access right in respect of the collected primary operational data to a second milking device connected to the network;
receiving primary operational data from the second milking device in response to the access right; and
managing the milking device on the basis of the collected primary operational data of the milking device and the primary operation data from the second milking device, further comprising:
defining a benchmark for detection of mastitis for the milking device from primary operational data of at least the second milking device;
comparing the primary operational data of the milking device with the benchmark;
defining a setting of the milking device based on the collected operational data of the milking device and the operational data of the second milking device;
comparing the defined setting to a current setting, if the defined setting differs from a previous setting by more than a threshold value, then the defined setting is sent to a controller for approval;
if the defined setting falls below the threshold or are approved by the controller, transmitting the defined setting via the network to at least one of the milking device and the second milking device.

14. The method of claim 13, wherein the mastitis detection parameter comprises at least one of: electrical conductivity, color of milk of a plurality of samples during operation of the milking device, dead milk time and milk yield proportion per quarter for milk.

15. The method of claim 14, wherein the benchmark is defined as:

$$Z=(x-\mu)/\sigma$$

wherein Z is the benchmark, μ is the average of the parameter value for at least one of electrical conductivity and color value of a predetermined number of preceding milkings, x is the value of the current milking visit for both electrical conductivity and milk color, and σ is the standard deviation of the predetermined preceding milkings.

16. The method of claim 15, wherein when Z is greater than 2, mastitis is determined to be present.

17. The method of claim 13, wherein the defined setting is configured to be at least one of modified or overruled by the controller.

* * * * *

UNITED STATES PATENT AND TRADEMARK OFFICE
CERTIFICATE OF CORRECTION

PATENT NO. : 8,918,475 B2  
APPLICATION NO. : 13/169116  
DATED : December 23, 2014  
INVENTOR(S) : Serge L. Loosveld et al.

Page 1 of 1

It is certified that error appears in the above-identified patent and that said Letters Patent is hereby corrected as shown below:

On The Title Page, Item (30) Foreign Application Priority Data

"April 1, 2010" should read -- April 1, 2009 --.

Signed and Sealed this  
Fourteenth Day of April, 2015

Michelle K. Lee  
*Director of the United States Patent and Trademark Office*